Figure 1:
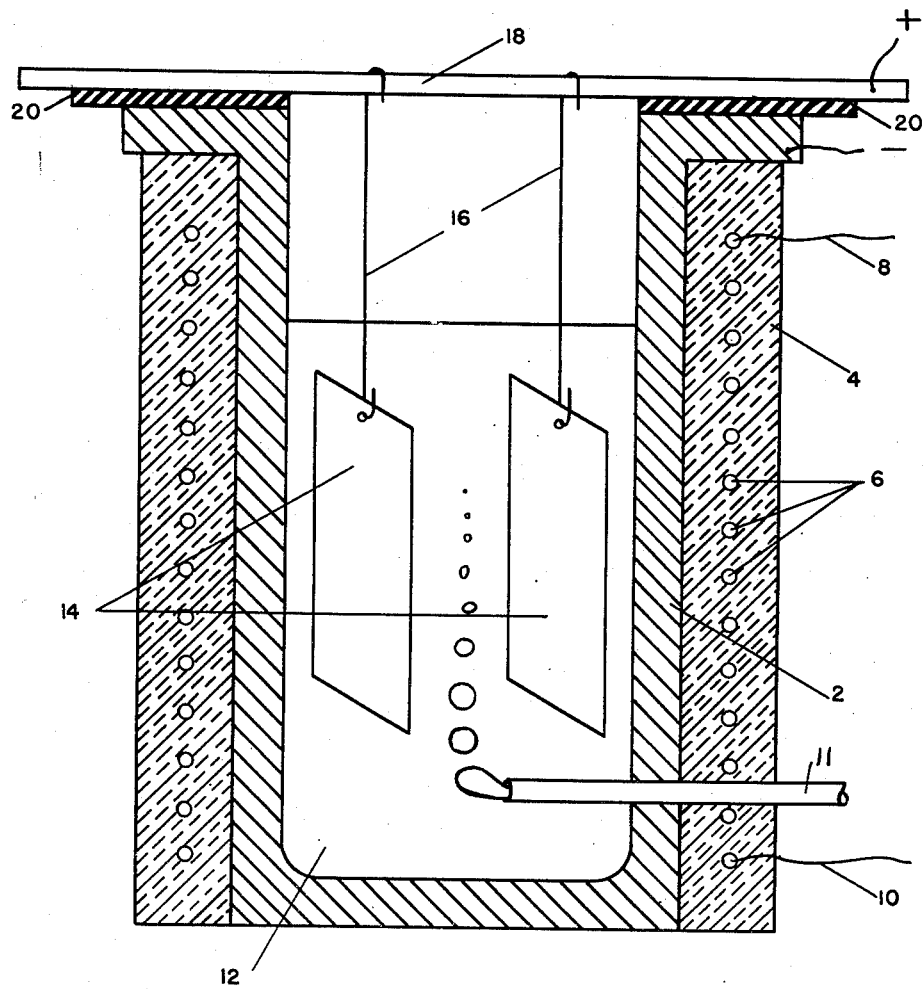

Aug. 21, 1956 H. F. PRIEST 2,759,886
PROCESS OF TREATING STEEL
Filed May 18, 1943

Homer F. Priest
INVENTOR
By—

2,759,886
Patented Aug. 21, 1956

2,759,886
PROCESS OF TREATING STEEL

Homer F. Priest, New York, N. Y., assignor to the United States of America as represented by the United States Atomic Energy Commission Application May 18, 1943, Serial No. 487,430

9 Claims. (Cl. 204—39)

This invention relates to the treatment of steel, and more particularly it relates to an electrolytic treatment of steel surfaces on which there is formed a coating, layer or sheath that is an electrical insulator, and that will largely reduce the deleterious corrosive action of halogen-containing compounds, particularly fluorine-containing compounds.

It is frequently desirable to use steel equipment or mechanism in contact with fluorine-containing, or other halogen-containing substances, for example, fluorine gas, hydrogen fluoride, or uranium hexafluoride. It is furthermore frequently desirable to provide such steel equipment for such uses, for example, steel motor laminations, with an electrically insulating covering material. Steel is, however, normally deleteriously attacked by halogen-containing substances, and conventionally used electrically insulating covering material such as varnishes, gums, and shellac are also badly attacked by fluorine-containing substances. It has long been desired to find a suitable material for coating or covering steel to make the same resistant to corrosive halogen-containing compounds, and which, preferably, will also be an electrical insulator.

It is an object of the present invention to provide a process for the treatment of steel to form on the steel a coating or covering that will make the steel resistant to the corrosive influence of halogen-containing compounds.

It is another object of this invention to provide a process for the treatment of steel to form on the steel an electrically insulating coating or covering.

It is still another object of this invention to provide a process for the treatment of steel to form on the steel a coating or covering that is electrically insulating and that will be resistant to attack by halogen-containing compounds, particularly fluorine-containing compounds.

It is still another object of this invention to provide a steel article of manufacture with an iron fluoride coating that is electrically insulating and also resistant to attack by halogen-containing compounds.

Other objects of the invention will appear hereinafter.

The objects may be accomplished, in general, by suspending the steel articles to be treated in a molten mass comprising a complex compound of potassium fluoride, KF, and hydrogen fluoride, HF, and passing an electric current through said mass with the said steel articles constituting the anode of the electric circuit. The invention will be more clearly apparent by reference to the following detailed description when taken in connection with the accompanying illustration, in which:

The figure is a diagrammatic, vertical cross-sectional view of apparatus suitable for use in carrying out the invention.

Referring to the drawings, reference numeral 2 designates a steel, copper, Monel, nickel, or aluminum container, provided with a heat insulating jacket 4 in which an electric heating coil 6 is imbedded. The numerals 8 and 10 designate lead wires to the electric heating coil 6. A quantity of potassium acid fluoride KF·HF is placed in the container 2, and the container 2 is heated to a temperature of about 250° C., so as to melt the KF·HF. A quantity of HF is, preferably continuously, bubbled into the molten material through a pipe 11 so as to prevent the solidification thereof. The rate at which the HF is passed into the molten material is preferably small, so that the HF will be completely dissolved in the molten KF·HF. The articles 14 to be treated, are suspended within the molten composition. This may be done by suspending the same by means of metal wires 16 from a metal rod 18, all of which are capable of conducting an electric current. The metal rod 18 is electrically insulated from the container 2 by means of insulating gaskets 20. The positive terminal of a source of direct current electricity is connected to the steel rod 18 and the negative terminal of said source of electricity is connected to the container 2.

In this manner the container 2 constitutes the cathode, and the articles 14 constitute the anode of a current passing through the molten material within the container.

The container 2 may, of course, be constructed of a non-conducting material in which case a metal conducting cathode must be positioned within the molten mass.

As the HF bubbles into the molten KF·HF, the temperature necessary to maintain the mass in a molten state may be dropped considerably. The actual treating process may be carried out at a temperature as low as 50° C.

The electric current passed through the molten treating bath may be of any desired current density. The current density may, for example, vary between ½ and 30 amperes per sq. in., depending to some extent upon the type of steel being treated and upon the composition of the electrolyte. For example, silicon steel, pure iron and carbon steel require different current densities to obtain similar results during a given period of time. Also different HF contents of the molten electrolyte will require different current densities to obtain like results during a given period of time. As the electrolytic process is carried out, it will be noted that the electric current quickly drops due to the formation of a coating on the steel articles 14. A material drop in current is an indication that the treatment has formed a suitable electrically insulating coating on the steel articles. The complete treatment may be carried out in a comparatively short time. Depending upon the current density, the treatment can be accomplished in a period of from 2 to 60 seconds.

Electric motor or transformer laminations, when treated in the above described manner, will contain an insulating coating which is substantially as satisfactory as previously known insulating coatings, such as varnish, shellac, gum or the like.

The following examples, which are not to be taken as limiting the invention, illustrate typical detailed methods by which the treatment of steel can be carried out in accordance with the present invention.

*Example I*

Gaseous HF was passed into a molten mass of KF·HF for a sufficient period of time to lower the melting point of the composition to about 65° C. A steel electric motor lamination having an area of one square inch was suspended in the molten electrolyte while the latter was maintained at a temperature of 65° C., and HF was continuously bubbled into the mass at a rate sufficiently high to maintain the mass in a molten state. The lamination was made the anode of an electric current having an initial intensity of 3 amperes, a current density of three amperes per square inch. The current was passed through the electrolyte for a period of 40 seconds. At the end of 40 seconds the current passing through the electrolyte was 2.7 amperes.

The resulting lamination was found to have a sufficient coating of an iron fluoride to constitute a completely satisfactory electric insulation when the lamination was used in an electric motor.

*Example II*

HF was passed into a molten mass of KF·HF until the melting point of the composition dropped to about 90° C. The mass was then maintained heated at a temperature of about 100° C., and HF was continuously bubbled into the mass to maintain the same in the molten state. An electric transformer lamination having an area of one square inch was suspended in the mass as disclosed in the illustration. The transformer lamination was made the anode of an electric current passing through the molten composition. The electric current had an initial intensity of 10 amperes, a current density of 10 amperes per square inch. After a period of 4 seconds, the amperage of the current had dropped to 8 amperes. The current was then shut off and the transformer lamination tested for completness of electrical insulation. The insulation, when tested, in a conventional manner to determine the dielectric value of an insulation with a probe using 1.5 to 2 volts, showed it to be very uniform and satisfactory for use as a lamination for electric transformers.

*Example III*

The process of Example II was repeated, using an electrolyte heated to a temperature of 120° C., and with the lamination of one square inch constituting the anode of an electric current, an initial current of 23 amperes, a current density of 23 amperes per square inch, was passed through the molten mass. After a period of 6 seconds, the amperage had dropped to 21 amperes and the resulting lamination was found to be completely satisfactory for use as a lamination in an electric motor.

As pointed out above, it is necessary, to prevent solidification of the KF·HF, to bubble HF into the molten KF·HF composition. In view of the fact that the melting point of the composition varies in accordance with the quantity bubbled into the mass, it is believed that the complex compound of KF and HF varies between KF·HF and KF·6HF, i. e., the complex compound may be composed of KF·HF or it may be composed of KF·2HF, KF·3HF, KF·4HF, KF·5HF, or KF·6HF. Therefore, by the term "complex compound of KF and HF" as used in the present specification and claims, any combination of the above mentioned compounds is meant to be included.

The cathode in the molten mass may be comprised of any electrical conductor, preferably however, the cathode is constituted of steel or iron, since the use of other cathodes, for example, graphite and copper cathodes have been found to impart a certain amount of impurity to the electrolyte and in some cases, such impurity eventually may make the electrolyte useless.

Since it is obvious that many changes and modifications can be made in the above described process and apparatus, it is to be understood that the invention is not to be limited to the above described details except as set forth in the appended claims.

I claim:

1. The process of treating a steel article which comprises suspending said article in a molten mass comprising a complex compound of KF and HF, and establishing an electric circuit by passing an electric current of ½ to 30 amperes per square inch through said mass for a period not exceeding 60 seconds with the article constituting the anode of said electric circuit to form an iron fluoride coating on said article.

2. The process of treating a steel article which comprises suspending said article in a molten mass comprising a complex compound of KF and HF, and establishing an electric circuit by passing through said mass an electric current having a density of not more than 30 amperes per square inch for a period of 2 to 60 seconds with the article constituting the anode of the electric circuit to form an iron fluoride coating on said article.

3. The process of treating a steel article comprising the steps of preparing a molten mass having a melting point of not less than approximately 250° C. and comprising a complex compound of KF and HF, continuously passing HF into said mass thereby reducing the melting point thereof to not more than approximately 100° C., maintaining the mass in a molten condition at approximately the last-named temperature, suspending the article in said mass, and establishing an electric circuit through said mass with the article constituting the anode of said circuit.

4. The process of treating a steel article comprising the steps of providing a molten mass comprising a complex compound of KF and HF, reducing the melting point of said compound at least 50 per cent by continuously passing HF therethrough, maintaining the mass in a molten condition by heating it to approximately its melting point, suspending the article in said mass, and establishing an electric circuit through said mass with the article constituting the anode of said circuit.

5. In the process of coating a metallic article, the steps of immersing said article in a fused bath comprising a fluoride compound having a melting point less than that of said article and less than that of the coating to be formed, substantially reducing the melting point of said compound by continuously passing HF therethrough, and establishing an electric circuit through said bath with the article constituting the anode of said circuit.

6. In the process of coating a metallic article, the steps of immersing said article in a molten mass comprising a fluoride compound having a melting point less than that of either said article or the coating to be formed, reducing the melting point of said mass at least 50 per cent by continuously passing HF therethrough, and establishing an electric circuit through said mass with the article constituting the anode of said circuit.

7. A quick electrolytic process of coating a ferrous metal article which comprises the steps of suspending said article in a molten fluoride compound having a melting point substantially less than the coating to be formed and substantially less than that of said article, and establishing through said mass an electric circuit having a current density not exceeding 30 amperes per square inch for a period not exceeding 60 seconds with the article constituting the anode of said circuit.

8. A quick electrolytic process of treating a metal article which comprises the steps of suspending said article in a fused bath comprising a fluoride compound having a melting point substantially less than that of either said article or the coating to be formed, and establishing through said bath an electric circuit having a current density of not more than 30 amperes per square inch for a period of not more than 60 seconds with the article constituting the anode of said circuit.

9. The method of coating a metal article comprising the steps of preparing a molten bath comprising a complex compound of KF and HF having a melting point less than that of either said article or the coating to be formed, maintaining the melting point of said mass at a temperature of not more than approximately 100° C. by passing HF therethrough, maintaining said mass at approximately said temperature, suspending the article in said mass, and establishing an electric circuit through said mass with the article constituting the anode of said circuit.

References Cited in the file of this patent

UNITED STATES PATENTS

| 2,162,129 | Soll | June 13, 1939 |

FOREIGN PATENTS

| 365,422 | Great Britain | Jan. 21, 1932 |
| 619,415 | Germany | Oct. 1, 1935 |

OTHER REFERENCES

Transactions of the American Electrochemical Society, vol. 35, pp. 335–349, 1919. (Copy in Division 56 of the Patent Office.)